April 22, 1952    J. C. PALITTO    2,593,914
ANALYTICAL RHOMBUS
Filed Dec. 20, 1949
*Fig. 1.*
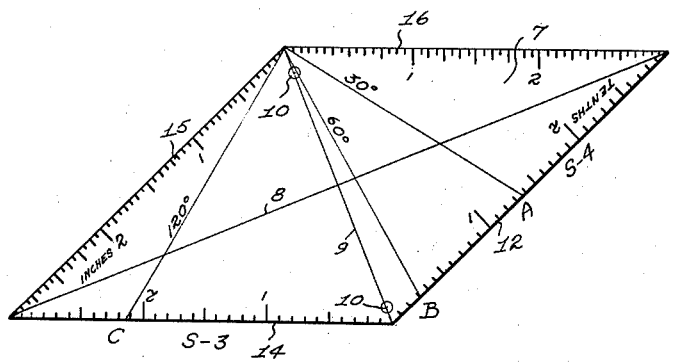
*Fig. 2.*
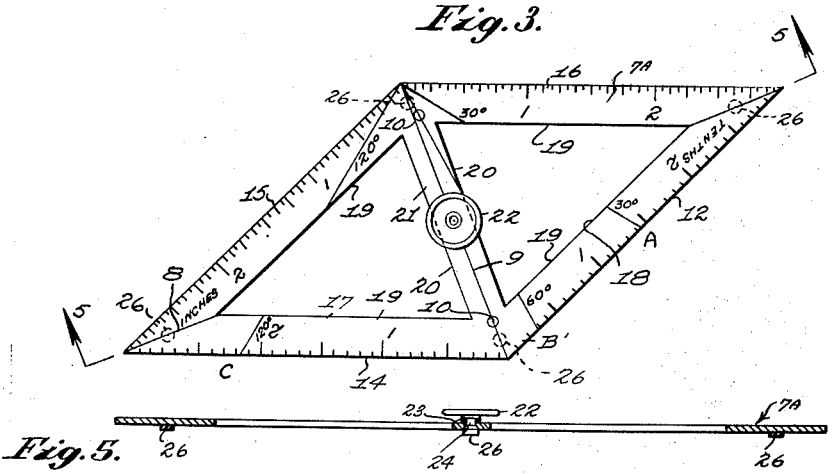
*Fig. 3.*
*Fig. 5.*
*Fig. 4.*
INVENTOR.
JOHN C. PALITTO
BY
McMorrow, Burman + Davidson
ATTORNEYS Patented Apr. 22, 1952

2,593,914

UNITED STATES PATENT OFFICE 2,593,914

ANALYTICAL RHOMBUS

John C. Palitto, Akron, Ohio

Application December 20, 1949, Serial No. 134,069

1 Claim. (Cl. 33—104)

This invention relates to an improved instrument for plotting points on third dimensional graphs in mathematical problems involving calculus, solid geometry, and third dimensional geometry, analytical geometry and the like, the primary object of the invention being to provide a unitary instrument of this kind which enables direct and immediate plotting of points in third dimensional graphing without involving the accompanying use of other instruments.

Another important object of the invention is to provide a simple, inexpensive and easily used device of the character indicated above which can also be advantageously used by draftsmen and others for determining and drawing the various angles of lines in perspective views, and in cross sectioning, and in drawing isometric views.

Other important objects and advantageous features of the invention will be apparent from the following description and the accompanying drawings, wherein, merely for purposes of illustration herein, specific embodiments of the invention are set forth in detail.

In the drawings:

Figure 1 is a top plan view of one embodiment.

Figure 2 is an edge elevation thereof.

Figure 3 is a top plan view of another embodiment.

Figure 4 is an edge elevation thereof; and,

Figure 5 is a vertical longitudinal section, taken on the line 5—5 of Figure 3.

Referring in detail to the drawings, wherein similar numerals and letters designate the like parts throughout the several views, and first to Figures 1 and 2 thereof, the numeral 7 generally designates a plane flat plate, of suitable material, such as metal or plastic, in the form of a diamond parallelogram and rhombus having sides S-1, S-2, S-3 and S-4.

The sides of edges S-1 and S-2 are related at an angle of 135°, the sides S-3 and S-4 at an angle of 135°, while sides S-1 and S-4 are related at an angle of 45°, and sides S-2 and S-3 are related at an angle of 45°.

A longitudinal cross line 8 is formed on or in the top of the plate 7 and bisects the 45° angles substended by the sides S-2 and S-3, and S-1 and S-4. Perpendicular to the cross line 8 is the transverse or vertical cross line 9, which bisects the 135° angles between the sides S-2 and S-1, and S-3 and S-4. Zero point indicators 10 are located at the ends of the cross line 9 to designate the apexes of the angles bisected thereby.

Also formed in or on the top of the plate 7 and originating at apex of the upper 135° angle between the sides S-2 and S-1 are the 30° line OA, the 60° line OB, and the 120° line OC.

The line OA intersects on the scale 12 along the S-4 side, which, in the illustration, is in inches divided into tenths. The 60° OB line also intersects the scale 12.

The 120° OC line intersects the scale 14 on the side S-3, which is in inch scale also divided into tenths. Scales 15 and 16 on the sides S-2 and S-1 are similar and are inch scales divided into eighths and subdivided into sixteenths. It will be understood that the scales can be divided otherwise than as shown and can be metric scales if desired. Scales 12 and 14 have their zero point at the meeting point of sides S-4 and S-3, while scales 15 and 16 have their zero point at the meeting point of sides S-2 and S-1.

The embodiment shown in Figures 3 to 5, which is intended to be in a larger size than that shown in Figures 1 and 2 and to be made of some lightweight material such as wood or plastic, comprises a similarly formed plate 7a, which, instead of being solid and imperforate like the plate 7, is formed with two isosceles triangular openings 17 and 18 with their sides 19 parallel to the plate sides and with their bases 20 spaced to define the cross bar 21. On the cross bar 21 at its middle is a knob 22 projecting upwardly therefrom, and secured thereto, as by means of a socket 23 fitting a boss 24 traversing the cross bar whereby the instrument may be applied and held to a surface by the knob 22. Rubber pads or feet 26 are placed on the corners of the plate 7a for similar functioning. The same cross lines and angle lines as shown and described in connection with the embodiment of Figures 1 and 2 are present in the embodiment of Figures 3 to 5.

While a variety of uses and applications of the described device can be made, an illustrative use thereof involves setting the side S-1 along the X-axis of a three dimensional graph with the upper O indicator 10 coinciding with the numerical value of X, then reading downwardly along the S-2 side for the value of Y and plotting the point on the graph, and from this point plotting the value of Z.

It is also feasible to plot the points X and Z first where they meet, then coincide the appropriate indicator 10 therewith, with the S-2 side parallel to the Y axis, and then read downwardly along the S-2 side for the value of Y and thereby obtain the point. Or, with the S-1 side parallel to the X-axis, reading downwardly along the S-2 side for the value of Y, will give the point desired.

In using the disclosed device for drafting angularly related lines, with the OA line set to coincide with a line or the drawing paper, drawing along side S-1 will produce a line related to the first line at 30°, drawing along side S-2 provides a line related at 105°. With line OB similarly coincided with a drawn line, drawing along side S-1 provides a 60° line, and along side S-2 provides a 75° line.

With line OC coincided with the drawn line, drawing along side S-1 provides a line related at 120° to the first drawn line, and drawing along side S-2 provides a 15° line. Thus the disclosed device provides without adjustment within the instrument for the drawing of lines at angles of 30°, 60°, 15°, 75°, 105°, and 120°, and at 45°, 135°, 22.5°, and 67.5°. The construction of other angles is readily done by combining any two or more of the directly obtained angles.

What is claimed is:

An instrument for plotting three dimensional graphs comprising a plate having four straight edges of equal length and having its opposite edges in parallel spaced relationship to each other and forming equal obtuse angles at two opposite corners of said plate and complementary equal acute angles at the other two corners, said plate being provided on one face thereof with scales extending one along each edge thereof, the meeting points of said edges at the obtuse corners of said plate being the zero point of the corresponding scales, said plate also having on said one face thereof a first straight line extending between the obtuse corners thereof and a second straight line extending between the acute corners thereof and being marked with a plurality of angle lines extending from one of said obtuse corners and terminating in spaced points along the edges of said plate remote from said one obtuse corner.

JOHN C. PALITTO.

REFERENCES CITED

The following references are of record in the file of this patent:

UNITED STATES PATENTS

| Number | Name | Date |
|---|---|---|
| D. 136,090 | Tripp | Aug. 3, 1943 |
| 2,398,143 | Jaediker | Apr. 9, 1946 |

OTHER REFERENCES

Publication: "Axonometric Drawing," by Paul F. Boehm; copyright 1944 by the Instrumaster Industries, Inc., Greenwich, Conn., page 10, figure 4.